United States Patent [19]

Perison, Sr.

[11] 3,734,447
[45] May 22, 1973

[54] REAR VISION MIRROR CONSTRUCTION

[75] Inventor: Ronald C. Perison, Sr., East Aurora, N.Y.

[73] Assignee: Standard Mirror Company, Inc., Buffalo, N.Y.

[22] Filed: Apr. 20, 1970

[21] Appl. No.: 29,789

[52] U.S. Cl. ................................................248/481
[51] Int. Cl. .................................................B60r 1/06
[58] Field of Search....................248/481, 482, 483, 248/181, 46, 475 A, 475 R, 38, 39, 40, 42, 44, 158, 160; 287/87; 285/DIG. 10, DIG. 11

[56] References Cited

UNITED STATES PATENTS

| | | | |
|---|---|---|---|
| 1,938,541 | 12/1933 | Oishei | 248/481 |
| 2,854,893 | 10/1958 | Henshall | 248/160 X |
| 2,968,995 | 1/1961 | Holden | 248/481 X |
| 3,041,031 | 6/1962 | Pearson | 248/158 |
| 3,363,872 | 1/1968 | Talbot | 248/483 |
| 3,448,553 | 6/1969 | Herr | 248/481 X |
| 2,505,588 | 4/1950 | Smith | 248/216 |

FOREIGN PATENTS OR APPLICATIONS

| | | | |
|---|---|---|---|
| 1,221,699 | 1/1960 | France | 248/475 B |
| 909,769 | 11/1962 | Great Britain | 248/481 |
| 1,113,356 | 5/1968 | Great Britain | 248/481 |

Primary Examiner—Chancellor E. Harris
Attorney—Sommer, Weber & Gastel

[57] ABSTRACT

A rear view mirror construction including a molded plastic base member having a metal pin embedded therein with a portion of the pin protruding beyond the base member for insertion into an aperture in the side of a vehicle and a fastener member spaced from the pin and extending through the base member for attachment to the vehicle, a ball carried by the base member, and a molded plastic mirror case supporting a mirror and pivotally mounted on the ball by means of a socket having bosses therein which are shrunk into engagement on the ball for providing a tight fit therewith.

15 Claims, 11 Drawing Figures

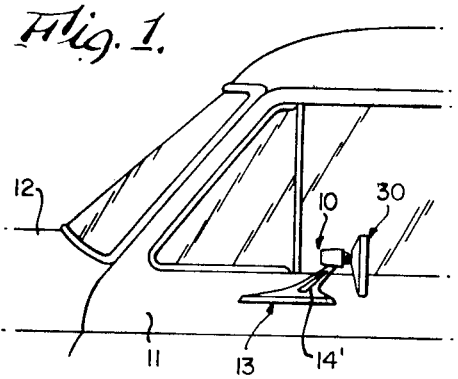
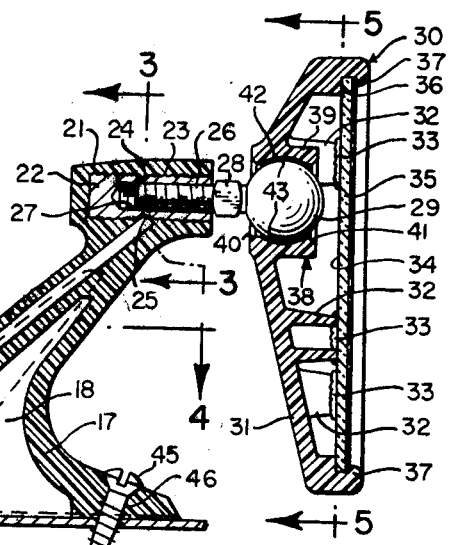
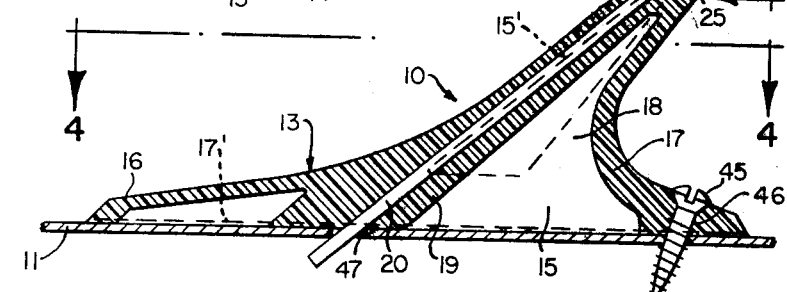
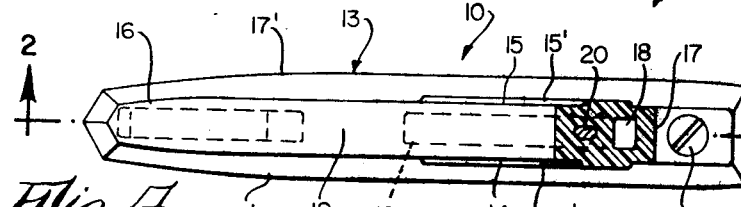
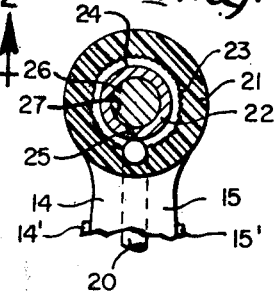
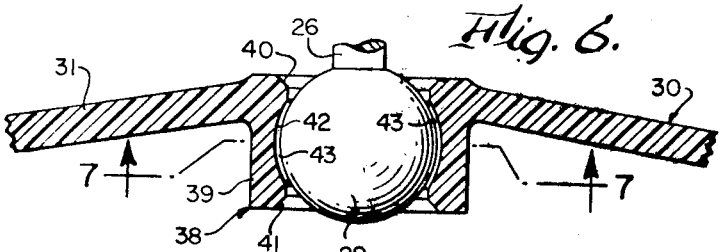
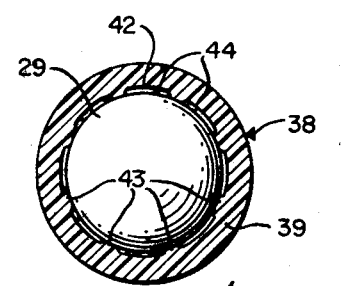
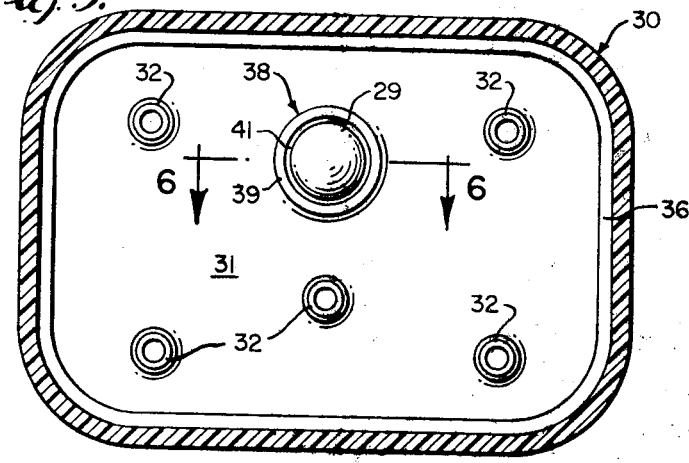
INVENTOR.
Ronald C. Perison, Sr.
ATTORNEYS

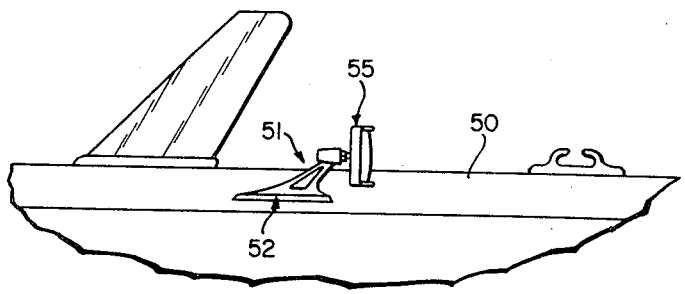
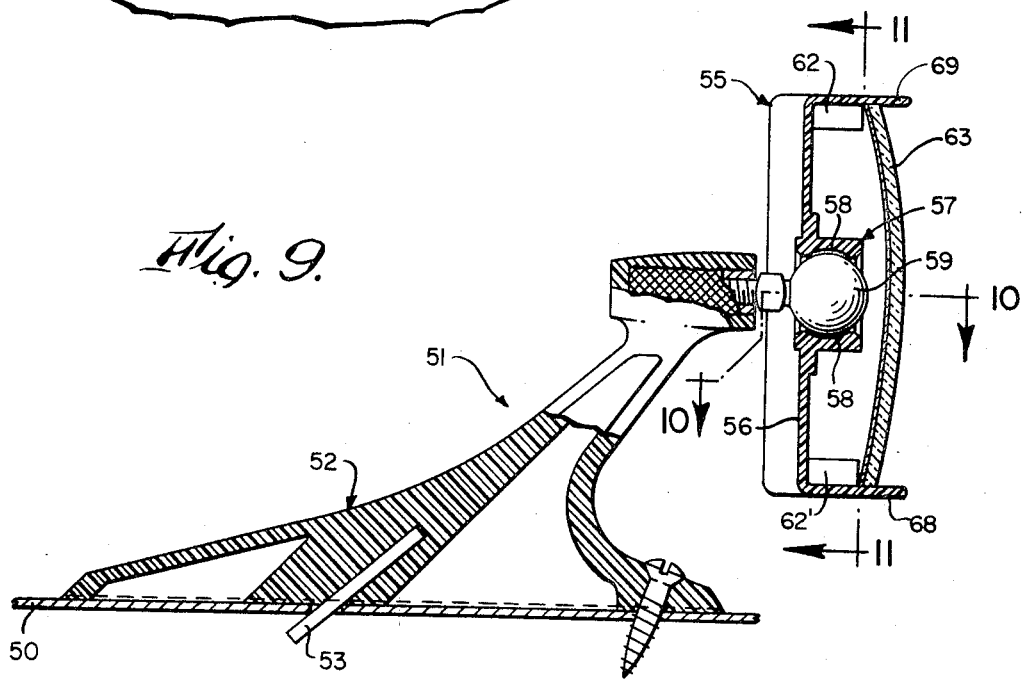
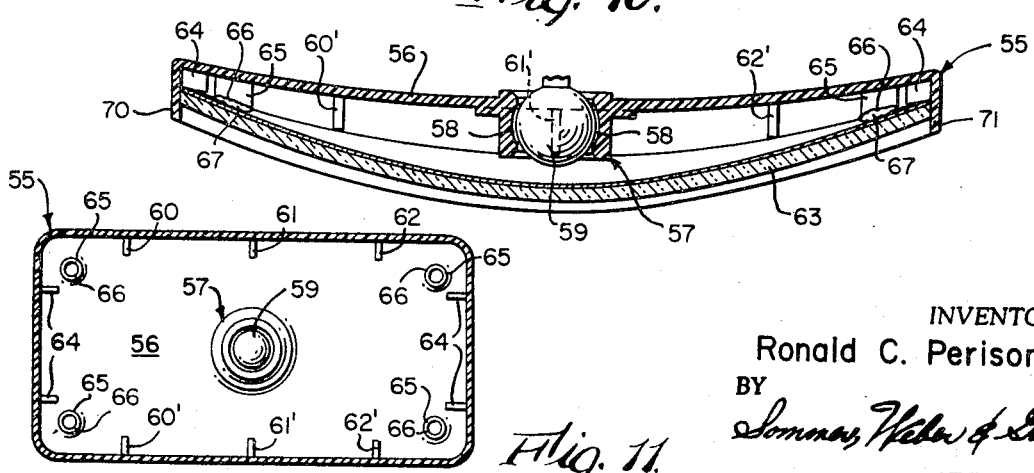

3,734,447

REAR VISION MIRROR CONSTRUCTION

The present invention relates to an improved rear vision mirror construction and more particularly to one in which the major components are fabricated from molded plastic.

It is one object of the present invention to provide an improved rear vision mirror in which the major components are fabricated from molded plastic and which has extremely high strength and excellent anti-vibrational characteristics.

Another object of the present invention is to provide an improved rear vision mirror construction in which the mirror case, which is fabricated out of plastic, includes an uniquely formed socket which is shrunk onto an associated ball so as to provide an extremely tight joint therewith. Other objects and attendant advantages of the present invention will readily be perceived hereafter.

The improved rear vision mirror construction of the present invention includes a molded plastic base member for attachment to a vehicle, a rigidizing pin molded in said base member having an end which protrudes beyond said base member for insertion into a mating aperture in a vehicle, a single fastener extending through the base member in spaced relationship to said protruding portion of said pin for completing the attachment to the vehicle, a mirror case mounted on a ball carried by said base member, said mirror case including a socket having a plurality of bosses therein, said socket being shrunk onto said ball to cause said bosses to provide spaced areas of tight engagement therewith.

The present invention will be more fully understood when the following portions of the specification are read in conjunction with the accompanying drawings wherein:

FIG. 1 is a fragmentary side elevational view showing the improved mirror construction of the present invention mounted on the outside of a vehicle;

FIG. 2 is a view partially in cross section taken substantially along line 2—2 of FIG. 4 and including the mirror case and related mounting structure;

FIG. 3 is a view taken substantially along line 3—3 of FIG. 2 and showing the manner in which the ball-carrying member is mounted on the base member;

FIG. 4 is a view taken substantially along line 4—4 of FIG. 2 and showing the configuration in plan of the base member;

FIG. 5 is a cross sectional view taken along line 5—5 of FIG. 2 and showing the mirror case structure;

FIG. 6 is a cross sectional view taken substantially along line 6—6 of FIG. 5 and showing the socket structure of the mirror case with respect to the ball which fits therein;

FIG. 7 is a cross sectional view taken substantially along line 7—7 of FIG. 6 and showing the socket structure of the mirror case;

FIG. 8 is a fragmentary side elevational view showing an alternate embodiment of the present invention mounted on the side of a boat;

FIG. 9 is a view similar to FIG. 2 but showing the structure of the alternate embodiment of FIG. 8;

FIG. 10 is a fragmentary cross sectional view taken substantially along line 10—10 of FIG. 9 and showing the manner in which the mirror is mounted in the mirror case; and FIG. 11 is a reduced view taken substantially along line 11—11 of FIG. 9.

The improved rear view mirror construction 10 of the present invention is shown in FIG. 1 as being mounted on the outside of door 11 of vehicle 12. It will be appreciated that mirror construction 10 may also be mounted on the fender or any other portion of the vehicle.

The mirror construction 10 includes an elongated base member 13 which is fabricated from molded plastic, preferably polypropylene, although other suitable plastics may be used. The base member 13 includes external side walls 14 and 15 which are connected by a rear edge portion 16 and a front edge portion 17. A hollow portion 18 is formed within base member 13 and is located between the side walls 14 and 15, the front edge 17 and continuous column 19 in which elongated cylindrical pin member 20 is embedded. Base member 13 is molded onto this pin member to provide rigidity to the construction. The fact that pin 20 extends throughout the full length of column 19 reduces vibrational flexing of the base member in operation. The outside walls 14 and 15 have decorative embossments 14' and 15', respectively, thereon which are mirror images of each other. Sides 14 and 15 merge into flange portions 16' and 17', respectively, to provide a relatively wide portion which engages the vehicle on which base member 13 is mounted.

Forming the upper end portion of base member 13 is a substantially cylindrical molded portion 21 which houses a hollow metallic ball carrying member 22 having a knurled outer surface 23 which causes it to be firmly embedded within cylindrical portion 21 inasmuch as it is molded integrally therewith. An annular V-shaped groove 24 is formed in the outer periphery of ball-carrying member 22 for receiving the upper end 25 of pin 20 in locking engagement, thus acting to rigidize the assembly.

As can be seen from FIG. 2, a threaded shank 26 is received in tapped bore 27 of ball-carrying member 22. A wrench-receiving nut 28 is formed integrally with shank 26, and proximate nut 28 is a spherical ball 29 which is formed integrally with shank 26. Shank 26 can be selectively screwed into member 22.

The mirror case 30 which is fabricated out of molded polypropylene includes a back 31 having a plurality of hollow circular posts 32 formed integrally therewith and extending outwardly therefrom. The outer ends of these posts receive cement 33 (FIG. 2) which attaches the posts to the metal back 34 of mirror 35. As can be seen from FIGS. 2 and 5, a peripheral shoulder 36 is provided against which the back of mirror 35 rests, and the entire periphery of mirror 35 is held in position by overhanging lip 37 proximate shoulder 36, thus providing complete peripheral support without the necessity of additional back-up padding. The mirror 35 is merely snapped into position.

For mounting mirror case 30 onto ball 39 a socket 38 is molded integrally into the mirror case. This socket includes an outer substantially cylindrical portion 39 having a central axis. Chamfered annular lips 40 and 41 are located at the ends of portion 39. The inner portion 42 is of partial spherical configuration to receive ball 29 in complementary mating relationship. As can be seen from FIGS. 6 and 7, the socket 38 includes a plurality of bosses or ribs 43 which extend substantially the entire distance between lips 40 and 41 and axially of cylindrical portion 39. These bosses 43 engage the surface of ball 29. Slot-like spaces 44 which extend substantially the entire distance between lips 40 and 41 are located between the bosses 43, as can be seen from FIGS. 6 and 7.

In accordance with the present invention the bosses 43 provide an extremely tight fit relative to ball 29 so as to hold the mirror case 30 firmly in any desired adjusted position. More specifically, the ball 29 is inserted into socket 38 after the mirror case 30 is withdrawn from the mold, while it is still warm. The annular lip or chamfer 40 facilitates the insertion of the ball 29 into the socket. The bosses 43 will be the first portions of the socket to cool and they will form a good tight fit with ball 29. Thereafter, the remainder of the socket will shrink and cause tightening of the bosses 43 about the ball, but the socket does not engage ball 29 at spaces 44. The foregoing action causes areas of relatively high contact pressure between bosses 43 and the ball which is greater than normally obtainable by full contact of the socket with the ball.

It can readily be seen from FIG. 2 that a screw 45 extends through aperture 46 in the lower end portion of base member and is received by the door portion 11. Screw 45 may be of the self-tapping variety. Screw 45 is inserted through aperture 46 only after the end of pin 20 has been inserted through a predrilled aperture 47 in door portion 11. Because the lower end of pin 20 extends obliquely outwardly from the bottom of base member 13 at an angle to surface 11, it cannot be withdrawn from said aperture after screw 45 has been installed. Thus a single screw can be used for securely fastening base member 13 to a supporting surface.

In FIGS. 8, 9 and 10 a modified mirror construction 51 is disclosed for use especially on items such as boat 50. The base member 52 of FIG. 9 is substantially the same in most structural respects as base member 13 of FIG. 2, except that pin 53 extends only partly through the length of the base member, as the anti-vibrational stability which is obtainable in the embodiment of FIGS. 1–7 with a longer pin is not needed in an embodiment which is used on a boat. Accordingly, since the length of pin 53 is the only substantial difference between the base members of the two embodiments, it is believed that a detailed repetition of the remainder of the base member structure is unnecessary and therefore will be omitted in the interest of brevity.

The mirror 51 includes a molded polypropylene mirror case 55 having a back 56 in which a socket 57 is centrally formed. This socket has a plurality of axially extending bosses 58 for engaging ball 59 which is analogous to ball 29 of the preceding embodiment and is carried on base member 52 in the same manner. It is also to be noted that bosses 58 are analgous to bosses 43 of the preceding embodiment and that the entire socket construction of socket 57 may be identical to that described above to obtain the same ultimate result, namely, a good tight fit by permitting this portion of the mirror case to shrink onto ball 59, as described in detail above.

The mirror case includes a plurality of upper spaced molded ribs 60, 61 and 62 and lower counterpart ribs 60', 61' and 62', respectively. As can be seen from FIG. 10, central ribs 61 and 61' are longer than corresponding ribs 60—60' and 62—62' so that they will all abut the rear of convex mirror 63.

The sides of mirror 63 are supported by lateral ribs 64 located as shown. Extending outwardly from mirror case back 56 and formed integrally therewith are hollow posts 65 which have ends 66 cut at an angle to the axis of the cylindrical posts so as to provide flush engagement with the back of the convex mirror. Adhesive 67 is applied to the edges of post 65 to secure the rear of mirror 63 to these posts in a permanent manner. As can be seen from FIGS. 9 and 10, the mirror case 55 includes a bottom edge 68 and a top edge 69 and two side edges 70 and 71. The insides of these edges locate mirror 63 in its proper position and include portions which extend beyond the mirror, as shown, for protecting the mirror. It is to be noted that ribs 60—62, 60'—62' and 64 are molded integrally with the back 56 and the sides 69–71 to lend rigidity to the mirror case, as well as locating the mirror, as discussed in detail above.

What is claimed is:

1. A rear view mirror construction comprising a base member for attachment to a vehicle, ball means mounted on said base member, a mirror case, and a socket in said case and having therein spaced bosses receiving said ball means, said socket being fabricated from molded plastic material and shrunk onto said ball means causing said bosses to tightly engage said ball means at spaced locations thereon.

2. A rear view mirror construction as set forth in claim 1 wherein said mirror case is fabricated integrally with said socket from said molded plastic material and wherein said socket is shrunk onto said ball means by cooling following insertion of said ball means while said socket is still warm.

3. A rear view mirror as set forth in claim 1 wherein said socket includes a central axis and wherein said bosses extend generally in the direction of said central axis.

4. A rear view mirror construction as set forth in claim 1 wherein said base member is fabricated from molded plastic and includes pin means molded into said base member and having one end extending obliquely outwardly therefrom for insertion into an aperture in a vehicle surface.

5. A rear view mirror construction as set forth in claim 4 wherein said pin means comprises an elongated member which extends substantially through the length of said base member for rigidizing said base member.

6. A rear view mirror construction as set forth in claim 5 including a ball carrying member molded into said base member and including a groove receiving the other end of said pin means.

7. A rear view mirror construction as set forth in claim 4 including a ball carrying member molded into said base member and including a tapped portion and a threaded shaft in said tapped portion and mounting said ball means.

8. A rear view mirror construction as set forth in claim 7 wherein said ball carrying member includes an irregular outer surface in locking engagement with said molded base member.

9. A rear view mirror construction as set forth in claim 1 wherein said pin means comprises an elongated member which extends substantially through the length of said base member for rigidizing said base member, and said ball carrying member includes groove means receiving the other end of said pin means.

10. A rear view mirror construction as set forth in claim 4 wherein said base member includes an aperture spaced from said one end of said pin means for receiving a threaded fastener which is to be secured to said vehicle surface whereby said base member may be locked at two spaced points to said vehicle surface by said fastener and pin means.

11. A rear view mirror construction comprising an elongated molded plastic base member, a hollow ball-carrying member molded into one end of said base member, and elongated pin means molded longitudinally into said base member and having one end extending obliquely outwardly from the other end of said base member for insertion into an aperature in a vehicle surface.

12. A rear view mirror construction as set forth in claim 11 wherein said ball-carrying member includes a tapped portion and a threaded shaft in said tapped portion mounting said ball.

13. A rear view mirror construction as set forth in claim 11 wherein said elongated pin means extends substantially through the entire length of said base member for rigidizing said base member.

14. A rear view mirror construction as set forth in claim 13 wherein said ball-carrying member includes groove means receiving the other end of said pin means.

15. A rear view mirror construction as set forth in claim 11 wherein said other end of said base member includes an aperture spaced from said one end of said elongated pin means for receiving a threaded fastener which is to be secured to said vehicle surface whereby said base member may be locked at two spaced points to said vehicle surface by said fastener and pin means.

* * * * *